United States Patent [19]
Altman et al.

[11] 4,112,837
[45] Sep. 12, 1978

[54] HOLDER FOR FRUIT AND THE LIKE

[76] Inventors: James E. Altman; Eston Altman, both of Gray, Ga. 31032

[21] Appl. No.: 698,798

[22] Filed: Jun. 23, 1976

[51] Int. Cl.$^2$ .................... A23N 15/02; B65G 47/22
[52] U.S. Cl. ........................... 99/537; 198/653; 198/694
[58] Field of Search ............... 99/537, 538, 543–549, 99/552–553; 134/70, 72–75, 126, 128, 131, 152, 170–171; 198/479, 652, 653, 695; 141/165–166; 211/14; 248/316 B, 112–113

[56] References Cited

U.S. PATENT DOCUMENTS

| | | | |
|---|---|---|---|
| 1,720,115 | 7/1929 | Barnes | 211/14 |
| 2,588,790 | 3/1952 | Altman | 99/546 |
| 2,953,236 | 9/1960 | Buchner | 198/653 |
| 3,162,225 | 12/1964 | Loveland | 99/544 |
| 3,332,559 | 7/1967 | Loveland | 99/549 |

FOREIGN PATENT DOCUMENTS 191,262 2/1907 Fed. Rep. of Germany ........... 141/165

*Primary Examiner*—Peter Feldman
*Assistant Examiner*—Robert Pous
*Attorney, Agent, or Firm*—Hill, Gross, Simpson, Van Santen, Steadman, Chiara & Simpson

[57] ABSTRACT

A holder assembly for fruit or the like adapted for use in washing of the type employed for the commercial processing of harvested fruit, etc. Such assemblies are usually mounted in gangs upon flight straps which move through one or more processing zones. Each assembly employs a base, a cup, preferably forked pairs of grasping arms for each cup, and biasing means urging such arms against their associated such cup. The holder emphasizes simple, reliable construction and operation.

22 Claims, 12 Drawing Figures

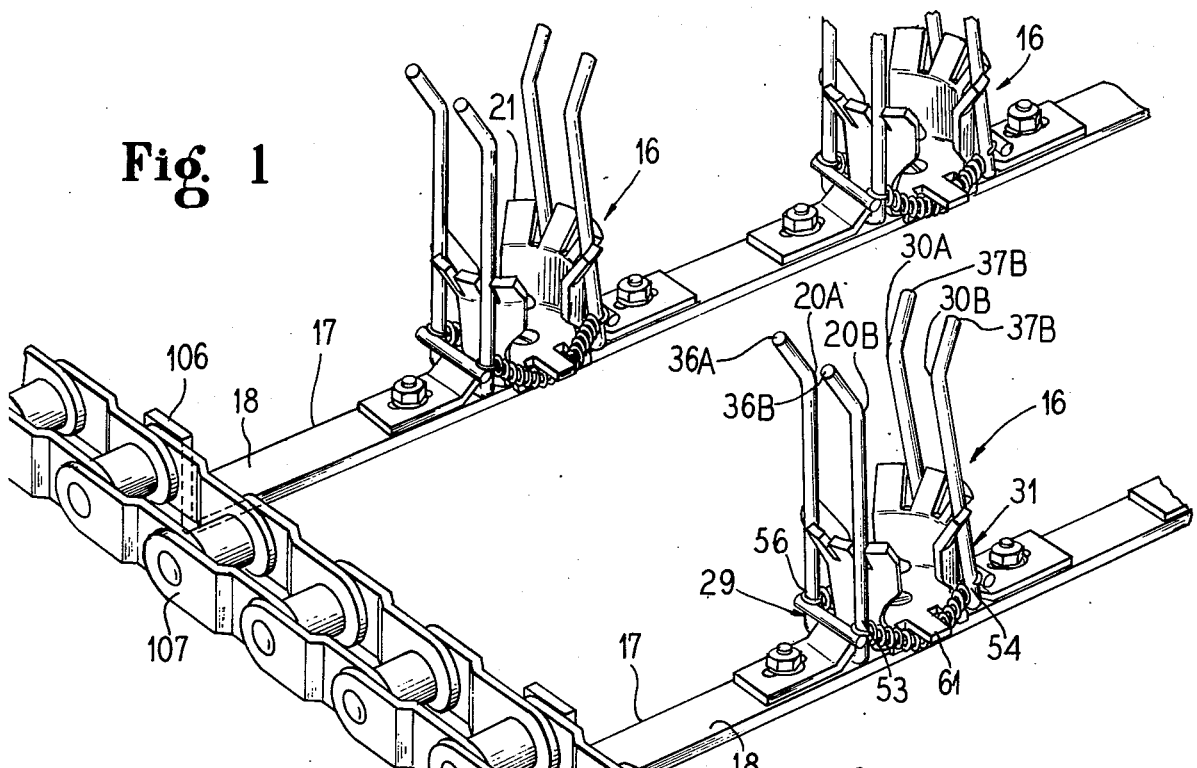
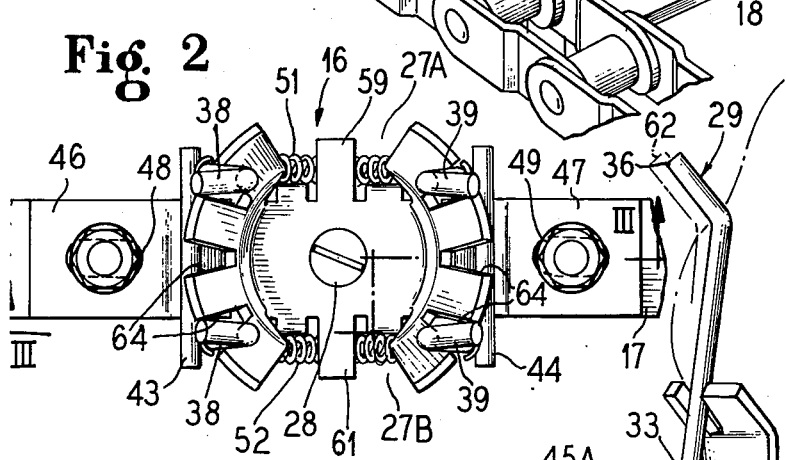
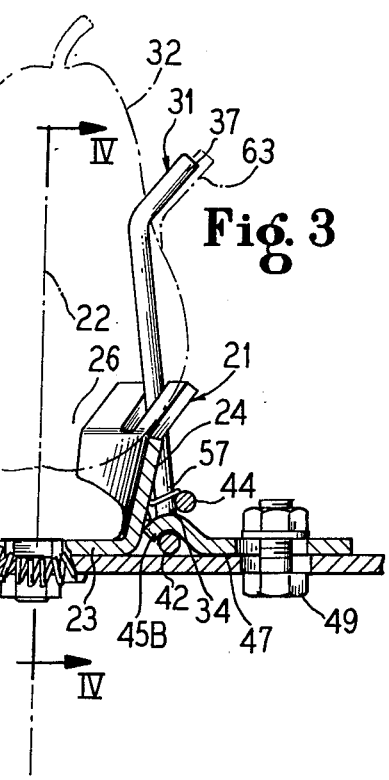
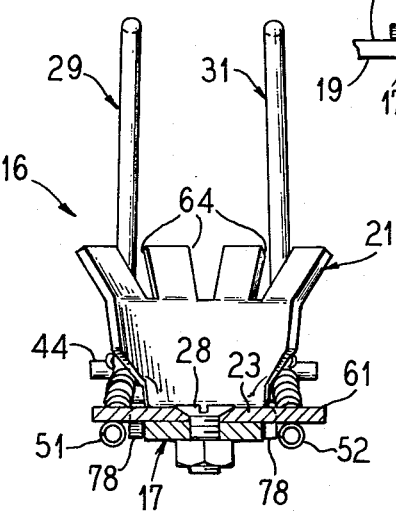

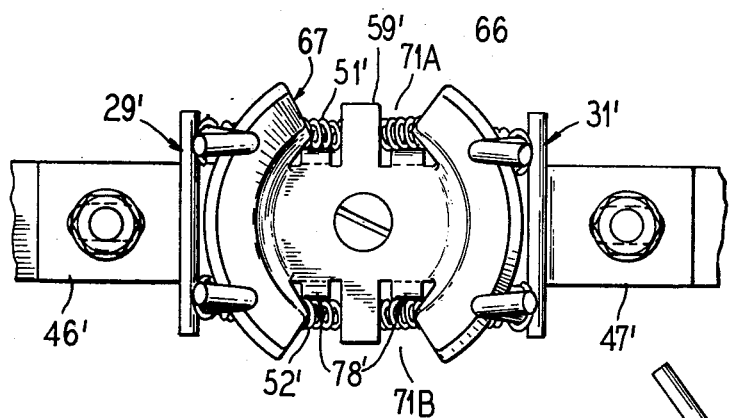
Fig. 5
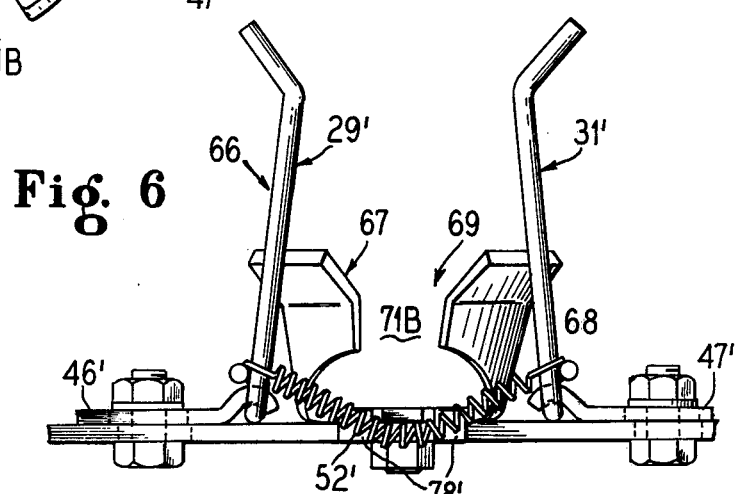
Fig. 6
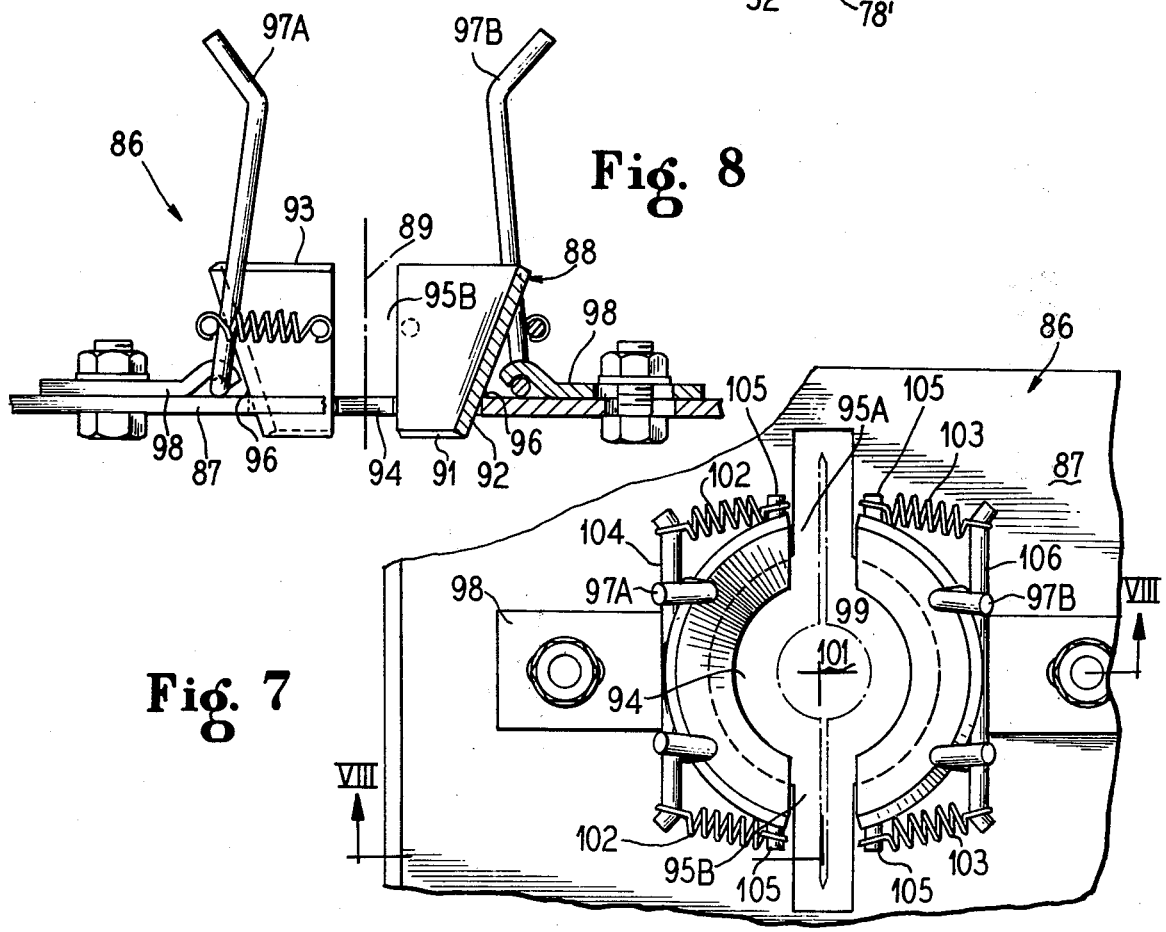
Fig. 8
Fig. 7

U.S. Patent    Sept. 12, 1978    Sheet 3 of 3    4,112,837
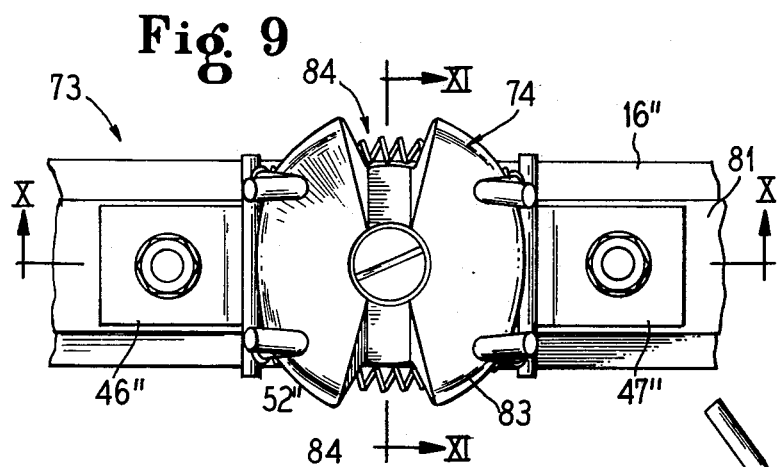
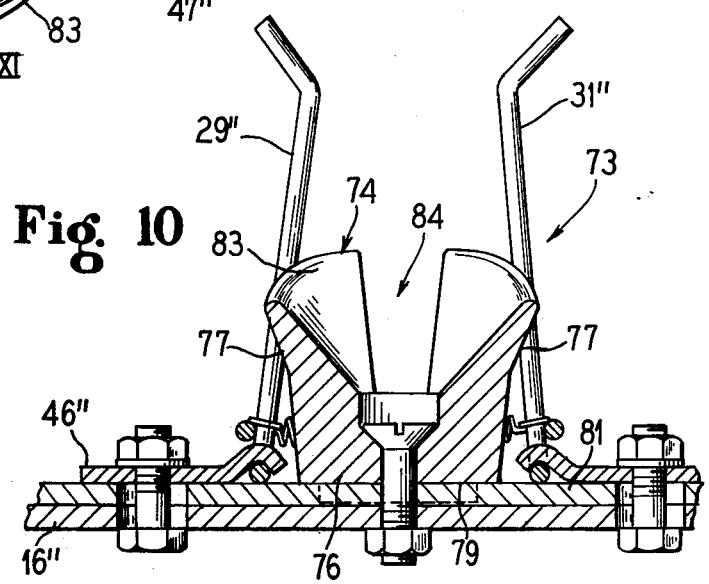
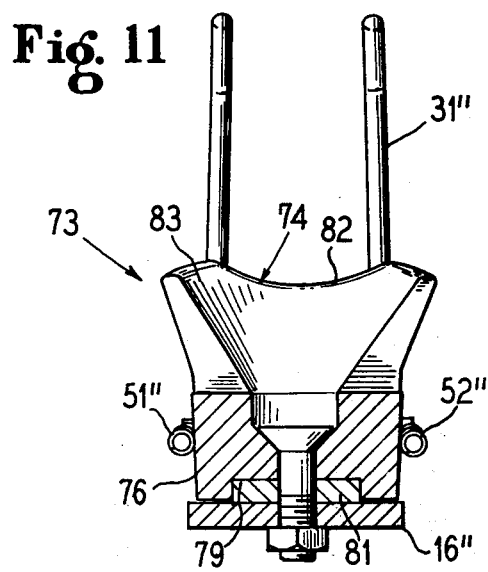
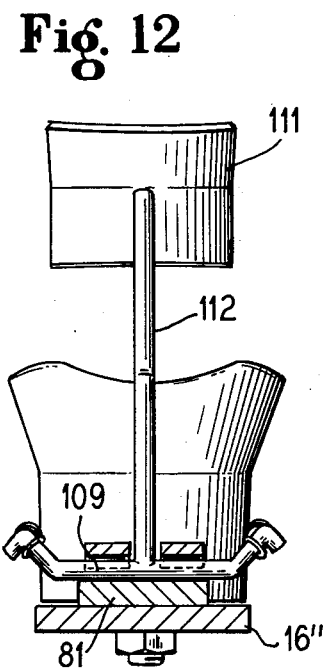

HOLDER FOR FRUIT AND THE LIKE

BACKGROUND OF THE INVENTION

In the art of processing fruit and the like in commercial quantities at high rates using machines, it is extremely important to employ holder assemblies which do not damage appreciably the individual pieces or items undergoing processing. In addition, holder assemblies which center, locate and even align individual pieces are much desired. Also, holder assemblies must be adapted for incorporation into gangs or the like for apparatus wherein a number of individual fruit pieces are each undergoing simultaneously individual or sequential processing steps. Further, holder assemblies must be simple, reliable, economical to fabricate and to operate, easy to maintain, and safe to load (if hand loading is contemplated).

Food machinery manufacturers have heretofore generally not been successful in making holder assemblies which solved all of these problems and needs. In effect, the human hand as a fruit holder, guided by a human brain, is a very difficult assembly to replace, yet the force of contemporary circumstances, particularly zooming labor costs, provides a most powerful incentive to such manufacturers to make commercially practical substitutes therefor for use in food processing machinery.

BRIEF SUMMARY OF THE INVENTION

The present invention seeks to provide an outstanding improved holder assembly for fruit or the like which satisfies the needs above identified for a device of this class and which overcomes disadvantages associated with prior art contrivances.

Briefly, a holder assembly of this invention is adapted for hand or machine loading, as desired, and it employs a base member to which is mounted a cup member. The cup member is defined by tapered side portions which terminate in a flared mouth.

The assembly also incorporates, for each cup member, a pair of generally upstanding rigid grasping arms.

Each arm is located adjacent a different outside region of the side portion of the cup member and the arms of each pair are in opposed relationship to each other about such associated cup member.

Each arm has a pivot axis located below the mouth of the associated cup for reciprocal movements towards and away from such cup. Pivotal connecting means for these arm pairs are provided. Spring means yieldingly generally equally bias each arm towards its said respective region.

The holder assembly of this invention is believed to represent a significant advance in the art because of its various features, particularly its ability to hold fruit in a specific orientation. The holder has a self-centering feature which is valuable in locating and aligning individual pieces of fruit for machine processing. The holder can be used with auxiliary apparatus in aiding the achievement of desired alignment. The holder assemblies cup does not appreciably interfere with an associated machine's operation or sequencing.

Other and further objects, aims, purposes, advantages, features and the like will be apparent to those skilled in the art from the accompanying specification taken with the drawings.

BRIEF DESCRIPTION OF THE DRAWINGS

In the Drawings:

FIG. 1 is a fragmentary perspective view of one embodiment of apparatus employing a plurality of holder assemblies of the present invention;

FIG. 2 is a plan view of one holder assembly of the type shown in FIG. 1, one part thereof broken away;

FIG. 3 is a partially sectionalized side elevational view taken along the line III—III of FIG. 2;

FIG. 4 is a vertical sectional view taken along the line IV—IV of FIG. 3;

FIG. 5 is a plan view of another embodiment of a holder assembly of this invention, one part thereof broken away;

FIG. 6 is a side elevational view of the embodiment shown in FIG. 5;

FIG. 7 is a plan view of yet another embodiment of a holder assembly of the invention, one part thereof broken away;

FIG. 8 is a vertical sectional view taken along the line VIII—VIII of FIG. 7;

FIG. 9 is a plan view of still another embodiment of a holder assembly of this invention, one part thereof broken away;

FIG. 10 is a vertical sectional view taken along the line X—X of FIG. 9, some parts thereof broken away;

FIG. 11 is a vertical sectional view taken along the line XI—XI of FIG. 9, some parts thereof removed; and FIG. 12 is an end elevational view of another form of arm assembly adapted for use in this invention.

DETAILED DESCRIPTION

Referring to FIGS. 1 through 4, there is seen an embodiment of a holder assembly of the present invention herein designated in its entirety by the numeral 16. Holder assembly 16 incorporates an elongated, flattened, rigid flight strap member 17 which has spaced, generally parallel faces 18 and 19, respectively.

Holder assembly 16 utilizes a cup member 21 which has an axis 22. Cup member 21 has a bottom wall 23, and integral, axially symmetrically upwardly extending, relatively deep side walls 24 which terminably define a radially outwardly flared, generally circular mouth region 26. The side walls 24 have defined therein a pair of opposed, axially extending slots 27 and 28 extending to bottom wall 23 from mouth region 26.

Mounting means securing cup member 21 to flight strap member 17 is conveniently here provided by a nut and bolt assembly 28 whose bolt axially extends through the bottom wall 23 and centrally extends through a section of strap member 17, the head of such bolt being countersunk in bottom wall 23 as shown.

Holder assembly 16 is provided with a pair of axially upstanding rigid arms 29 and 31. Each arm 29 and 31 is located adjacent a different outside region of side walls 24 in opposed relationship to each other. Arms 29 and 31 are in circumferentially equally spaced relationship to the slots 27. As those skilled in the art will appreciate, slots 27 are an optical feature for a holder assembly 27 and are provided so as to permit the holder assembly 16 to be employed in a fruit processing operation where a blade member or the like decends from an overhead position at a processing station into engagement with fruit (such as the pear 32 shown in phantom form in FIG. 3) and where, but for the presence of the slots 27, the blade member or the like, used for pear splitting or for other operation, would made undesirable connection with the side walls 24.

The arms 29 and 31 generally have a base, such as bases 33 and 34 of respective arms 29 and 31, and an end region, such as end regions 36 and 37 of respective arms 29 and 31. An arm, such as arm 29 and 31, is so constructed as to have a pivot axis as its base, such as bases 33 and 34, respectively, of arms 29 and 31. The pivot axis is oriented in a holder assembly, such as holder assembly 16, for radial, reciprocal movements of the associated arm, such as arm 29 or arm 31, respectively, towards and away from its respective adjacent region of side wall portions 24, in holder assembly 16. Characteristically, each arm, such as arms 29 or 31, has generally a pair or circumferentially spaced, radially generally equally positioned fruit abutment portions adjacent its terminal end, such as portions 20A and 20B for arm 29 and 30A and 30B for arm 31, defined in its end region, such as end regions 36A and 36B, arm 29 and end regions 37A and 37B of arm 31.

For example, in holder assembly 16, each arm 29 and 31 is comprised of a forked member having a pair of circumferentially (relative to cup 21) spaced tines 38, in the case of arm 29, and similarly spaced tines 39 in the case of arm 31. Each respective pair of tines 38 and 39 here extends from its respective arm base 33 and 34 in spaced, parallel relationship to one another, and each base 33 and 34 is provided by a cross shaft member 41 and 42 which in effect defines the pivot axis of its respective associated arm 29 and 31. In holder assembly 15, each arm is further provided with a cross brace 43 and 44, respectively, which extends transversely between the individual ones of respective tine pairs 38 and 39. In holder 16, each of the arms 29 and 31 is conveniently formed as respects its respective tine pairs 38 and 39 and respective cross shafts 41 and 42 by a single piece of wire suitably bent and formed, and the respective cross brases 43 and 44 are secured to the respective tines 38 and 39 by welding or the like. The outer terminal end portions 36A and 36B, and 37A and 37B of respective tine pairs 38 and 39 are outwardly flared, which is preferred in a holder assembly 16 for convenience in loading a holder assembly 16 with a fruit piece, such as pear 32. In addition to bracing its respective arm 29 and 31, each cross brace further serves as a stop means limiting radially outward movement of its associated arm 29 and 31. Thus, when each arm 29 and 31 is radially outwardly moved, the respective cross braces 43 and 44 engage an adjoining surface of the respective retainer clips 46 and 47 at the position of farthest desired limit of travel. In addition, the respective cross faces 43 and 44 provide a mounting location for association with spring bias means, as is hereinafter further explained.

The retainer clips 46 and 47 serve as pivotal connecting means for holder assembly 16, one clip 46 being employed for arm 29 and the other clip for arm 31. Each retainer clip 46 and 47 is in the form of a generally flattened body having a hook-like projection 45A and 45B, respectively, formed at one end thereof, which projection 45A and 45B as the case may be, is adapted to be in a radially adjacent but spaced position to cup member 21. The configuration of such hook-shaped projection 45A and 45B is adapted to receive and engage therein the respective bases 33 and 34 of arms 29 and 31 for pivotable movements thereof relative to the respective clips 46 and 47.

Fastening means for securing each clip 46 and 47 to flight strap member 17 is here conveniently provided by the respective nut and bolt assemblies 48 and 49. The bolt portion of each assembly axially extends through a slotted aperture formed in the body portion of each clip 46 and 47, and also each respective bolt centrally extends through an appropriately formed aperture (which may be slotted) in the adjoining strap member 17. Thus, in accordance with the preferred practice of the present invention, each holder assembly 16 is provided with retainer clips 46 and 47 which are radially adjustable relative to axis 22, thereby permitting locating the position of each base 33 and 34 at an optimum position, the choice of position in any given instance being dependent upon the particular size, shape and configuration of the particular fruit to be processed at any given time and upon processing equipment and conditions.

Each of the arms 29 and 31 of holder assembly 16 is provided with spring means yieldingly generally equally biasing each arm 29 and 31 towards its associated region of cup member 21. Thus, in holder assembly 16, a pair of coiled springs 51 and 52 are provided. Each spring 51 and 52 extends between a base adjacent edge portion of each arm 29 and 31, but on a different side thereof, such as spring 51 between base adjacent edge portions 53 and 54 of respective arms 29 and 31, and spring 52 between base adjacent edge portions 56 and 57 of respective arms 29 and 31. Each such spring 51 and 52 is deflected downwardly towards a side edge of strap member 17 under the slots 27a and 27b. Such deflection is achieved by positioning each spring 51 and 52 below a radially outwardly projecting integral tab 59 and 61 from the bottom wall 23; such an arrangement serves to maintain the channel formed by slots 27a and 27b in an open condition as desired for a holder assembly 16.

For use, a fruit piece, such as pear 32, is manually or mechanically pushed against the end regions 36 and 37 of respective arms 29 and 31, which then spread so that the fruit, such as pear 32, is permitted to descend generally along axis 22 downwardly till such rests against the side walls 24 about the mouth region 26 of cup member 21. Typically and preferably, when such a piece of fruit, such as pear 32, is mounted in holder assembly 32, the arms 29 and 32 have been pivoted outwardly only to a relatively small extent, such as is shown for example by the phantom lines 62 and 63, respectively, for arms 29 and 31 (see FIG. 3).

In holder assembly 16, the various components are preferably formed of metal, particularly alloys of ferrous metals which are relatively inert towards the juices of fruit and the like, such alloys being well known to the art. In holder assembly 16, cup member 21 is preferably formed from a heavy gauge sheet metal by various conventional stamping and forming operations.

In mouth region 26, side walls 24 of cup member 21 have defined therein a plurality of serrations or tapered slots 64. Such serrations 64 are useful in a holder assembly 16 when holder 16 is being used in fruit or like processing involving rotating processing equipment. In such circumstances, such serrations 64 tend to retard twisting movements of fruit, such as pear 32, positioned in holder assembly 16, such twisting movements being common in coring and similar processing operations. In addition, such serrations 64 also permit the straight sides of respective arms 29 and 31 to be inclined somewhat relative to a vertical position in relation to their respective bases 33 and 34 towards the axis 22 when the respective tine pairs 38 and 39 are aligned with individual serrations 64 as shown.

Referring to FIGS. 5 and 6, there is seen an alternative embodiment of a holder assembly of this invention which embodiment is herein designated in its entirety by the numeral 66. Holder assembly 66 is similarly constructed to holder assembly 16 and corresponding components of holder assembly 66 are similarly numbered, but with the addition of prime marks thereto. Holder assembly 66 differs primarily from holder assembly 16 in that holder assembly 66 employs a cup member 67 whose side walls 68 terminate in a circular flared mouth region 69 without any serrations, such as serrations 64, being formed therein. Cup member 67, like cup member 21, has formed therein opposed slots here identified as 71a and 71b.

The bottom wall 23 of cup member 21 has formed therein integral downturned tabs 78 (four in all, two being on each side of tab 61) which aid in rigidifying the mounting of the cup member 21 to flight strap member 17, the spacing between the tabs 78 being such as to admit therebetween the width of flight strap member 17, as shown, in FIGS. 1 through 4, and also as shown for the holder assembly 66 in FIGS. 5 and 6 (see downturned tab 78').

Referring to FIGS. 9, 10 and 11 there is seen another embodiment of a holder assembly of this invention which embodiment is herein designated in its entirety by the numeral 73. Holder assembly 73 is similar in construction to holder assembly 16, and corresponding components are similarly numbered but with the addition of double prime marks thereto. Holder assembly 16 employs a cup member 74 which, unlike cup members 21 and 67, is formed of a cast metal, such as an aluminum alloy. Cup member 74 includes a base or bottom portion and integral side wall portions 77. Cup member 74 has a channel 79 extending across the bottom face of bottom portion 76 which has dimensions adapted for extending cup 74 over a mounting bar 81. In turn, the mounting bar 81 with at least a majority of the functional components of holder assembly 73 positioned thereabove, is mounted against the flight strap member 16" (see, for example, FIG. 10).

Selection of a cup member for a given holder assembly is heavily influenced by the type of fruit intended for the use or the processing thereon. Thus, for example, the type of cup arrangement shown in FIGS. 1 through 4 is particularly well suited for use in the retaining of pears, bell peppers, or the like. On the other hand, the type of cup illustrated in the embodiment of FIGS. 9 through 11 is particularly well suited for use with pears, oranges, and apples. The dished lip 82 in the vicinity of arm 29" in the rim of mouth region 83 of cup member 74 is advantageous for use in splitting such fruit as pears. The thickened (axially) bottom portion 76 provides a cup member which supports a fruit in a more elevated position than is obtained with for example, cup member 21. In holder assembly 73, no downward deflection of the spring members 51" and 52" is needed, since here the slots 84 terminate above the thickened bottom portion 76.

Referring to FIGS. 7 and 8, there is seen a further embodiment of a holder assembly of this invention herein designated in its entirety by the numeral 86. Holder assembly 86 employs an elongated flattened rigid strap member 87 having spaced, generally parallel faces. A cup member 88 with an axis 89 is defined by a pair of, axially extending, circumferentially equally spaced side wall portions 92 which portions 92 are tapered so as to define an open circular flared mouth region 93. The portions 92 thus define therebetween a pair of opposed, axially extending slots 94a and 96b. The bottom 91 is open. Thus, in effect, the cup member 88 is comprised of two hemicircular tapered sections.

An aperture 94 is defined in strap member 87, aperture 94 being of circular configuration and being adapted to have received or inset thereinto the cup member 88 so that the portions 92 engage adjacent edge portions of strap member 87 in aperture 94. The side wall portions 92 are secured to strap member 87 by spot welding 96, or the like.

Holder assembly 86 is equipped with a pair of arms 97 which are pivotably mounted by respective retainer clip pair 98, the arms 97 and the retainer clips 98 being fabricated in the manner as shown and described above in relationship to the holder assembly 16. With holder assembly 86, a knife blade 99 (shown with phantom lines) can be reciprocatorily plunged using a blade shaft 101 (shown with phantom lines) completely through a holder assembly 86, if desired, as part of a processing operation upon fruit, or the like.

In holder assembly 86, spring means for biasing the arms 97 towards side wall portions 92 is provided by two pairs of coiled springs 102 and 103, spring pair 102 being operably positioned between the end of a cross brace 104 of arm 97 and a spur 105 outwardly integrally extending from cup member 88 adjacent slot 95a and 95b, and springs of each pair 103 extending between a cross brace 106 of arm 97b and a tab or spur 95 on the cup 88 adjacent the slots 95 thereof.

Turning to FIG. 12, there is seen an alternative embodiment of an arm assembly suitable for incorporation into a holder assembly of this invention. At its base, such an arm has a pivot axis 109, and at its open or outer end each axis has a circumferentially extending flared portion 111 formed of shaped sheet metal or the like. Each flared portion 111 is supported by and conveniently secured to a single arm member 112 as by welding or the like. It is preferred in accordance with the practice of this invention to have a terminal portion of such an arm in a flared, circumferentially extending condition so as to support a given piece of fruit in more than one position by an opposing pair of such arms employed in a holder assembly. Hence, a given arm employed in a holder assembly of this invention preferably contacts a given piece of fruit in at least two circumferentially spaced positions, such positions being located above the level of the mouth of an associated cup member.

A plurality of holder assemblies of this invention can be mounted in gangs upon flight straps which move through one or more processing zones. Thus, referring to FIG. 1, each strap member 17 has mounted on face 18 thereof a plurality of holder assemblies 16, each holder assembly 16 being located in spaced relationship to one another. Opposed ends of flight strap member 17 are folded to form tab pairs 106 (one tab 106 only being shown in FIG. 1). Each such completed flight strap member 17 is then mounted by such tabs 106 to a pair of transversely spaced drive chains 107 (only one chain 107 being shown in FIG. 1) at periodic regularly spaced intervals along endless chain 107. Sub-assemblies comprised of an individual flight strap member having mounted thereon a plurality of holder assemblies are thus located in spaced relationship to each other between chains 107 at spaced parallel intervals. In this manner a plurality of individual pieces of fruit can be continuously processed in a processing zone simultaneously at each of a plurality of individual holder stations 16 on each flight strap member 17. Such simultaneous multiple treatment of fruit members at a single processing station is known to and conventionally practiced in the art of food machinery manufacture and use, as those skilled in the art will readily appreciate.

Other and further embodiments, variations, applications, and the like for the holder assembly of this invention will be apparent to those skilled in the art without departing from the spirit and teachings of the present invention.

The claims are:
1. A holder assembly for fruit and the like comprising
   (A) a base member,
   (B) a cup member for holding fruit defined by side wall portions which terminate in a flared mouth,
   (C) mounting means securing said cup member to said base member,
   (D) a pair of generally upstanding rigid grasping arms, each one being located adjacent to a different outside region of said side portions in opposed relationship to the other thereof, each one having a pivot axis located below said mouth for reciprocal movement of said one arm towards and away from its said respective region,
   (E) independent pivot means for each one of said arm pairs, and
   (F) spring means independently yieldingly generally equally biasing each arm towards its said respective region, thereby permitting independent movement of each one of said arm pairs.

2. The assembly of claim 1 wherein said side portions have a pair of opposed upwardly extending slots defined therein located in generally equally spaced relationship to said regions.

3. The assembly of claim 1 wherein said cup member has a bottom wall portion, and said side portions are integral with said bottom portion.

4. The assembly of claim 3 wherein said cup member is comprised of cast metal.

5. The assembly of claim 3 wherein said cup member is comprised of stamped sheet metal.

6. The assembly of claim 1 wherein said base comprises an elongated, flattened, rigid strap member having spaced, generally parallel faces.

7. The assembly of claim 1 wherein said pivot axis is located generally adjacent said base member.

8. The assembly of claim 1 wherein each arm at its upper end region terminates in transversely separated portions whereby said pair of arms is adapted to engage fruit or the like therebetween at more than one contact point for each arm.

9. The holder assembly of claim 1 wherein each arm includes a single upstanding tine member.

10. The holder assembly of claim 1 wherein each arm includes two upstanding tine members.

11. A holder assembly for fruit and the like comprising
   (A) an elongated, flattened, rigid, strap member having spaced, generally parallel faces,
   (B) a cup member for holding fruit with an axis and having a bottom portion and integral axially extending relatively deep side wall portions which terminably define a radially outwardly flared generally circular mouth, said side walls having defined therein a pair of opposed, axially extending slots originating at said mouth,
   (C) mounting means securing said cup member to said strap member,
   (D) two pairs of axially upstanding, rigid arms, each one of said pairs
       (1) being located adjacent to a different outside region of said side wall portions in opposed relationship to the other thereof in circumferentially equally spaced relationship to said slots,
       (2) having a base and an end region,
       (3) having a pivot axis at said base thereof, said pivot axis being oriented for radial reciprocal movements of one said arm pair towards and away from its associated said region,
       (4) having generally circumferentially spaced, radially generally equally positioned portions defined at said end region thereof.
   (E) independent pivot means for each one of said pivot axes, and
   (F) spring means independently yieldingly generally equally biasing each one of said arm pairs towards its associated said region, thereby permitting independent movement of each one of said arm pairs.

12. The holder assembly of claim 11 wherein said pivotal connecting means comprises a pair of retainer clips each with means for fastening same at different location on said strap member, and wherein each said base and said associated pivot point thereof for each arm is engaged with a different one of said clips adjacent said strap member.

13. The holder assembly of claim 12 wherein said means for fastening is adjustable for radially shifting the position of each said base.

14. The holder of claim 13 wherein said fastening means for each said clip comprises a nut and bolt assembly whose bolt axially extends through a slotted aperture in the associated said clip and centrally extends through a section of said strap member.

15. The holder of claim 11 wherein said cup member is mounted against one surface of said strap member, and wherein said mounting means comprises a nut and bolt assembly whose bolt axially extends through said bottom portion and centrally extends through a section of said strap member.

16. The holder assembly of claim 11 wherein said cup member is received in said strap member through an opening defined therein, wherein said slots divide said cup member generally into two halves, and wherein said mounting means comprises welding means.

17. The holder assembly of claim 11 wherein a transversely extending channel is defined in said strap member in the region of said opening, said channel being aligned with said slots and coactable therewith to provide an orifice adapted for axial extension of a blade member or the like through said cup member.

18. The holder assembly of claim 11 wherein said cup member has a plurality of serrations defined in said side wall portions adjacent said mouth.

19. The holder assembly of claim 18 wherein tine portions of each arm pair are receivable generally within different ones of said serrations.

20. The holder assembly of claim 11 wherein said cup member is comprised of cast metal, and wherein said spring means comprises a pair of coiled spring members, each one of said pair of spring members extending between base adjacent edge portions of said pairs of arms but on a different adjacent side thereof.

21. A subassembly for a machine employed for processing fruit and the like comprising
  (A) an elongated, flattened, rigid flight strap member having generally parallel faces,
  (B) a plurality of cup shaped members for holding fruit each with mounting means securing such to said strap member in spaced relationship to one another,
  (C) each said cup shaped member having an axis, a bottom portion and integral axially extending relatively deep side wall portions which terminably define a radially outwardly flared generally circular mouth, said side walls having defined therein a pair of opposed, axially extending slots originating at said mouth,
  (D) each cup having associated therewith a pair of generally axially upstanding, rigid arm means, each one of said pair of arm means
    (1) being located adjacent to a different outside region of said side wall portions in opposed relationship to the other thereof, in circumferentially equally spaced relationship to said slots,
    (2) having a base and an end region,
    (3) having a pivot axis at said base thereof, said pivot axis being oriented for radial reciprocal movements of said one arm means towards and away from its associated said region,
    (4) having generally circumferentially spaced, radially generally equally positioned portions defined at said end region thereof,
  (E) each cup further having associated therewith independent pivot means for each one of said pivot axes, and
  (F) each cup further having associated therewith spring means independently yieldingly generally equally biasing each arm means towards its associated said region, thereby permitting independent movement of each one of said arm means of each pair thereof.

22. The subassembly of claim 21 wherein each arm means is comprised of a forked member with a pair of transversely terminably spaced tines, relative to each associated said cup member, each such tine pair being joined together by a crossed shaft to define said base and said pivot axis thereof.

* * * * *